UNITED STATES PATENT OFFICE.

HENRY SMITH AND HIRAM F. SNOW, OF DOVER, NEW HAMPSHIRE.

IMPROVED BEVERAGE.

Specification forming part of Letters Patent No. 56,458, dated July 17, 1866.

*To all whom it may concern:*

Be it known that we, HENRY SMITH and HIRAM F. SNOW, of Dover, in the county of Strafford and State of New Hampshire, have invented an Improved Compound for a Summer Beverage, which we denominate "Smith's White Root-Beer;" and we do hereby declare that the following is a full and exact description of the method of compounding and preparing the same.

We use the following quantities and proportions of ingredients, or thereabout, for a cask of forty gallons of the beverage: American sarsaparilla (*Aralia nudicaulis*) root, dried, eight ounces; life-of-man (*Aralia racemosa*) root, dried, two ounces; prince's pine, (*Chimaphila umbellata*,) dried, one ounce. Soften these in a mortar, then add hops, one-fourth ounce. Boil the whole in about two gallons of water fifteen or twenty minutes. Then add twenty-five pounds of best crushed sugar and stir till it is all dissolved.

For a ferment we take two quarts of baker's (or potato) yeast, and stir wheat or other flour into it until it is of about the consistence of gruel. Let it stand in a warm place till it rises.

For flavoring we take the following essential oils in proportions here stated, or thereabout: Oil of spruce, (*Abies nigra*,) two ounces; oil of checkerberry, (*Gaultheria procumbens*,) one ounce; oil of sassafras, (*Sassafras officinale*,) one-fourth ounce. Take two tea-spoonfuls of this compound and put into a pint of good molasses, stir well together, and let them stand, stirring occasionally for half an hour or more.

The cask (which may be a cider-barrel) should be perfectly clean. First put in the compound of roots and herbs prepared as above; then add the flavoring-mixture of essential oils and molasses stirred into half a pailful of water; finally, mix well the yeast ferment in half a pailful of water and pour it into the cask, stirring briskly all together therein; fill the cask up with water and allow the whole to ferment. Within about twenty-four hours after the fermentation commences the beverage will be ready to draw off for bottling. Fill the bottles within about an inch of the cork, so as to leave a little space for the formation and retention of the carbonic-acid gas.

What we claim as our invention, and desire to secure by Letters Patent, is—

A beverage prepared from the ingredients and substantially in the proportions and manner herein specified.

The above specification of our improved white root-beer signed by us this 31st day of May, 1866.

HENRY SMITH.
      HIRAM F. SNOW.

Witnesses:
 W. T. PERKINS,
 MARCELLUS MORGAN.